(12) United States Patent
Phelps et al.

(10) Patent No.: US 10,279,577 B2
(45) Date of Patent: May 7, 2019

(54) ELECTROSTATIC 3-D PRINTER HAVING ROTATING MAGNETIC CORES WITHIN DEVELOPER ROLLS

(71) Applicant: Xerox Corporation, Norwalk, CT (US)

(72) Inventors: Robert W. Phelps, Victor, NY (US);
John R. Uchal, Webster, NY (US);
James E. Williams, Penfield, NY (US);
Paul F. Sawicki, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 372 days.

(21) Appl. No.: 15/135,623

(22) Filed: Apr. 22, 2016

(65) Prior Publication Data

US 2017/0305092 A1     Oct. 26, 2017

(51) Int. Cl.

| | |
|---|---|
| *B29C 67/00* | (2017.01) |
| *B33Y 10/00* | (2015.01) |
| *B33Y 30/00* | (2015.01) |
| *B29C 64/205* | (2017.01) |
| *B29C 64/245* | (2017.01) |
| *B29C 64/147* | (2017.01) |
| *G03G 15/16* | (2006.01) |
| *G03G 15/22* | (2006.01) |

(52) U.S. Cl.
CPC ............ *B33Y 10/00* (2014.12); *B29C 64/147* (2017.08); *B29C 64/205* (2017.08); *B29C 64/245* (2017.08); *B33Y 30/00* (2014.12); *G03G 15/1625* (2013.01); *G03G 15/224* (2013.01)

(58) Field of Classification Search
CPC ............ B29C 67/0074; B29C 67/0092; B29K 2995/0062
See application file for complete search history.

(56) References Cited

U.S. PATENT DOCUMENTS

| | | | | |
|---|---|---|---|---|
| 4,165,393 A | * | 8/1979 | Suzuki ................ | G03G 13/09 430/106.1 |
| 4,331,757 A | * | 5/1982 | Tanaka ................ | G03G 15/09 399/254 |
| 4,545,670 A | | 10/1985 | Itoh et al. | |
| 6,066,285 A | * | 5/2000 | Kumar ................ | G03G 15/224 264/317 |
| 6,775,504 B2 | | 8/2004 | Godlove et al. | |
| 7,250,238 B2 | | 7/2007 | Fromm et al. | |

(Continued)

*Primary Examiner* — Daniel McNally
(74) *Attorney, Agent, or Firm* — Gibb & Riley, LLC

(57) ABSTRACT

A 3-D printer includes development stations that electrostatically transfer first and second materials to an intermediate transfer surface. The development stations can each include a photoreceptor supplying the materials to the intermediate transfer surface, and a boosted developer roll supplying the materials to the photoreceptor. The boosted developer roll comprises an outer roll rotating in a first rotational direction to move with movement of the photoreceptor, and a magnetic roll within the outer roll rotating in a second rotational direction opposite the first rotational direction. The magnetic roll comprises alternating permanent magnets. The intermediate transfer surface transfers a layer of the materials to a platen each time the platen contacts the intermediate transfer surface to successively form a freestanding stack of layers on the platen. A bonding station is positioned to apply light and/or heat to the freestanding stack to bond the layers to one another.

20 Claims, 19 Drawing Sheets

(56) References Cited

U.S. PATENT DOCUMENTS

| | | |
|---|---|---|
| 7,270,408 B2 | 9/2007 | Odell et al. |
| 7,851,549 B2 | 12/2010 | Sacripante et al. |
| 8,470,231 B1 | 6/2013 | Dikovsky et al. |
| 8,488,994 B2 | 7/2013 | Hanson et al. |
| 9,193,110 B2 | 11/2015 | Pridoehl et al. |
| 2004/0114967 A1* | 6/2004 | Godlove ................ G03G 15/09 399/267 |
| 2012/0276233 A1 | 11/2012 | Napadensky |
| 2013/0186558 A1 | 7/2013 | Comb et al. |
| 2014/0134334 A1 | 5/2014 | Pridoehl et al. |
| 2015/0142159 A1 | 5/2015 | Chang |
| 2015/0145174 A1 | 5/2015 | Comb |

\* cited by examiner

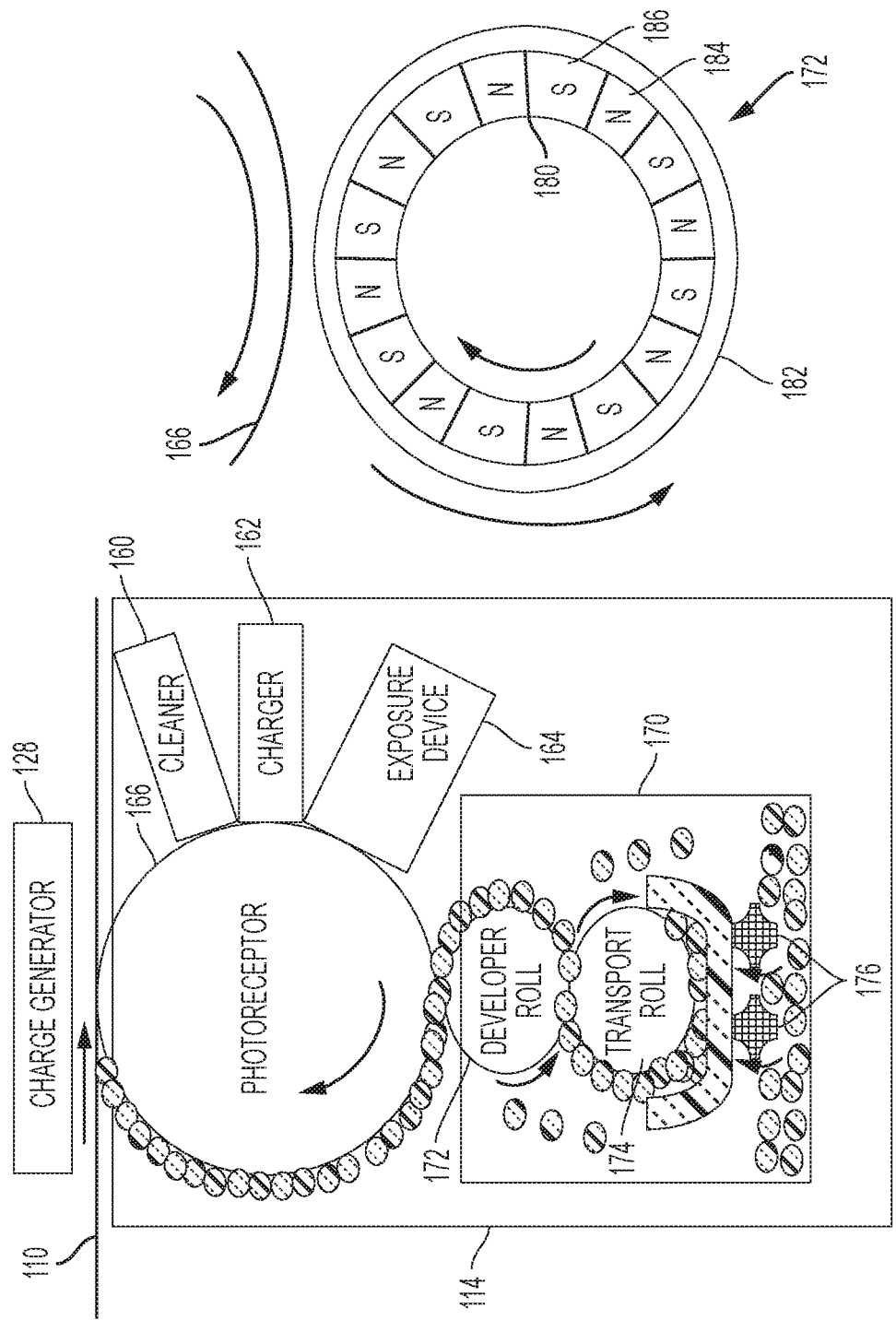

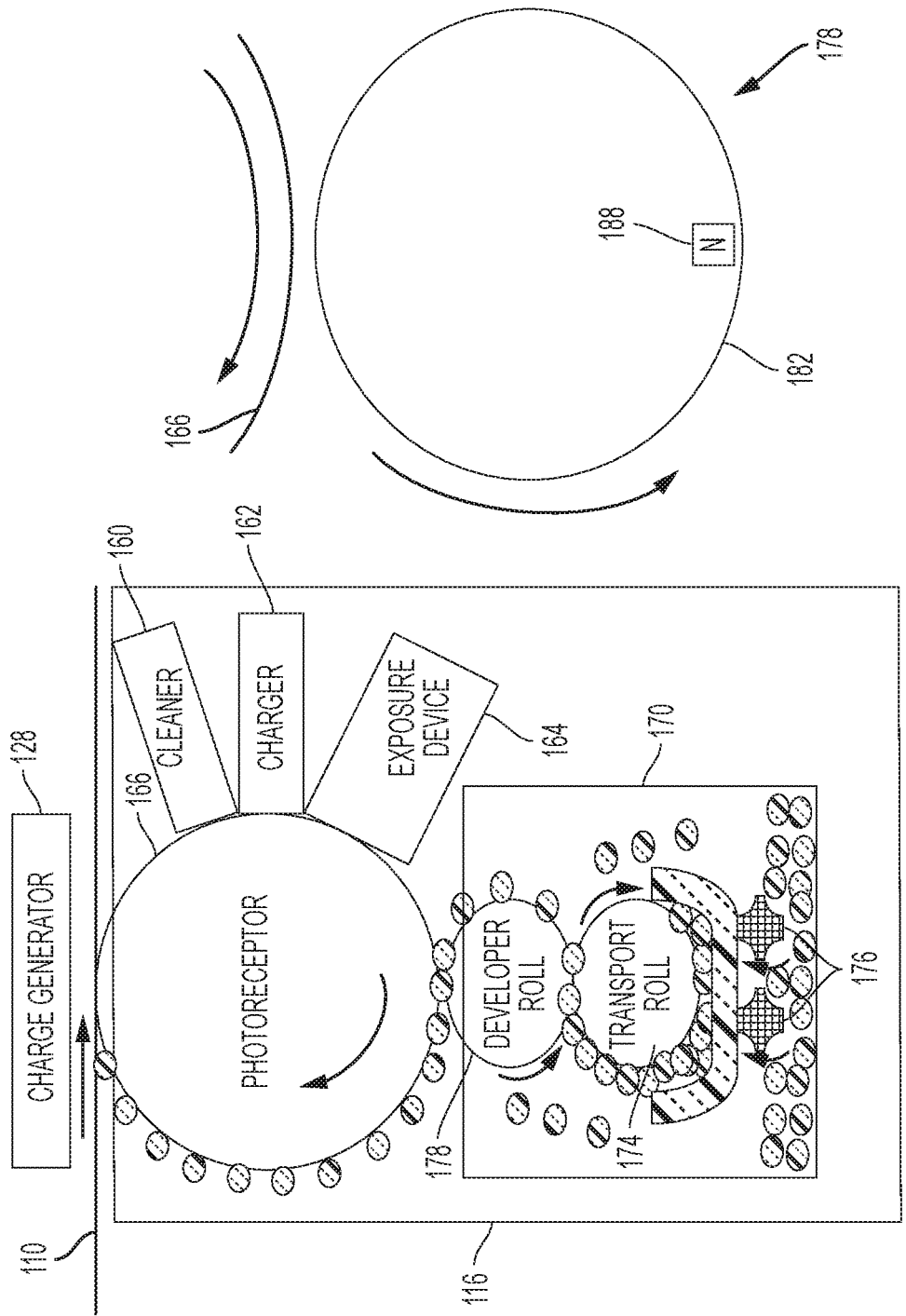

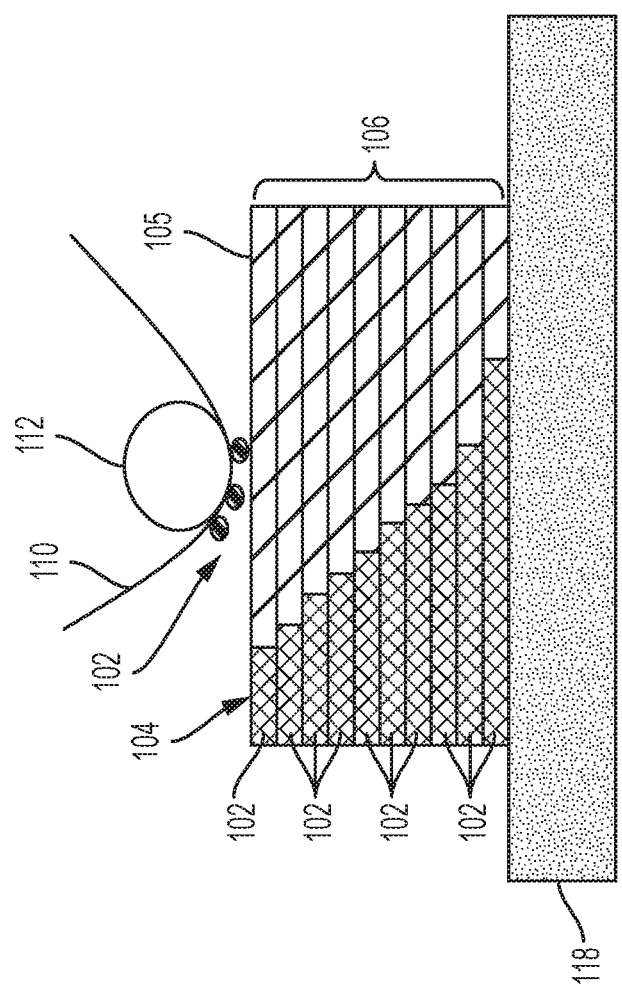

ELECTROSTATIC 3-D PRINTER HAVING ROTATING MAGNETIC CORES WITHIN DEVELOPER ROLLS

BACKGROUND

Systems and methods herein generally relate to three-dimensional printing processes that use electrostatic printing processes.

Three-dimensional printing can produce objects using, for example, ink-jet printers. In one exemplary three-stage process, a pulverulent material is printed in thin layers, a UV-curable liquid is printed on the pulverulent material, and finally each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, a first development station positioned to electrostatically transfer a first material to an intermediate transfer surface, and a second development station positioned to electrostatically transfer a second material to a location of the intermediate transfer surface where the first material is located. The second material is different from the first material.

The first development station and the second development station can be the same, or can be different. Each development station includes a photoreceptor that supplies the first or second material to the intermediate transfer surface. Also, in both development stations, a transport roll supplies the first material or the second material to a developer roll. However, one of the development stations (or both) can include a boosted developer roll, and the other may include fixed magnet developer roll.

The boosted developer roll comprises an outer roll rotating in a first rotational direction to move with movement of the photoreceptor, and a magnetic roll within the outer roll rotating in a second rotational direction, opposite the first rotational direction. The magnetic roll comprises alternating permanent magnets. The magnetic roll is coaxial with the outer roll and the magnetic roll has a smaller diameter than the outer roll; and therefore, the outer roll is between the magnetic roll and the photoreceptor. The fixed magnet developer roll includes one or more fixed magnets located where the material attaches to the outer roll, and the outer roll rotates around such fixed magnet(s).

Therefore, only one of the development stations may include the boosted developer roll that has the counter-rotating magnetic roll, while other development station(s) can include developer rolls that use fixed magnets, and do not have a counter-rotating magnetic roll. Rotation of the magnetic roll within the outer roll increases the amount of material that the boosted developer roll is able to supply to the photoreceptor, relative to the fixed magnet developer roll.

As noted above, the first material is different from the second material, and may have different characteristics. The increased material production capability of the boosted developer roll can help to accommodate such different characteristics of the different materials. Therefore, the rotation of the magnetic roll can allow one of the development devices (e.g., the second development device) to supply more of the second material to the second photoreceptor relative to the amount of the first material the fixed-magnet developer roll supplies to the first photoreceptor, to accommodate different characteristics of the first and second materials.

Additionally, a platen moves relative to the intermediate transfer surface. The intermediate transfer surface transfers a layer of the first material and the second material to the platen each time the platen contacts the intermediate transfer surface, and this successively forms layers of the first material and the second material on the platen. The layer of the first material and the second material is on a discrete area of the intermediate transfer surface and is in a pattern before being transferred to the intermediate transfer surface.

Also, fusing and/or bonding stations can be positioned to apply light and/or heat to the freestanding stack to fuse/bond the layers within the freestanding stack to one another on the platen. The fusing and/or bonding stations can apply light and/or heat after each time the intermediate transfer surface transfers each of the layers of the first material and the second material to the platen. An optional support material removal station can be positioned to receive the freestanding stack from the platen. The support material removal station removes the second material without affecting the first material to leave a 3-D structure made of only the first material.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 2 is an expanded schematic diagram illustrating a development device herein;

FIG. 3 is an expanded schematic diagram illustrating a development roll herein;

FIG. 4 is an expanded schematic diagram illustrating a development device herein;

FIG. 5 is an expanded schematic diagram illustrating a development roll herein;

FIG. 21 is an expanded schematic cross-section diagram partially illustrating devices herein.

DETAILED DESCRIPTION

As mentioned above, electrostatic printing process are well-known means of generating two-dimensional (2-D) digital images, and the methods and devices herein use such processing for the production of 3-D items (for 3-D printing). However, the process is time consuming due to the many multiples of passes required to build up the 3-D parts. Further, when performing 3-D printing using electrostatic processes (especially those that use an ITB), the thermal management is a challenge because of the high temperatures used to transfuse the material from the ITB to a platen, where the ITB is cooled before returning to the development device(s). Additionally, with 3-D printing that uses electrostatic processes, the mechanical integrity of the printed material may be compromised if it is very thin, and the transfer process can impose stripping shear forces that damage the material.

In order to address such issues, the methods and devices disclosed herein provide development subsystems with a very high development efficiency that are able to apply thick layers of build and support material, thereby reducing the number of passes required to complete a given 3-D part. More specifically, such development subsystems herein include a counter-rotating magnetic core with alternating poles. Two component developer has carrier particles that are permanently magnetized and toner particles that are consistent with the specified part material. The combination of the rotating magnets with alternating magnetic fields acting upon the permanently magnetized carrier beads generates an intense amount of agitation resulting in nearly full development efficiency out of the developer. This dramatically increases the developed layer thickness and reduces the number of fabrication passes, increasing production capacity.

Figure 1:
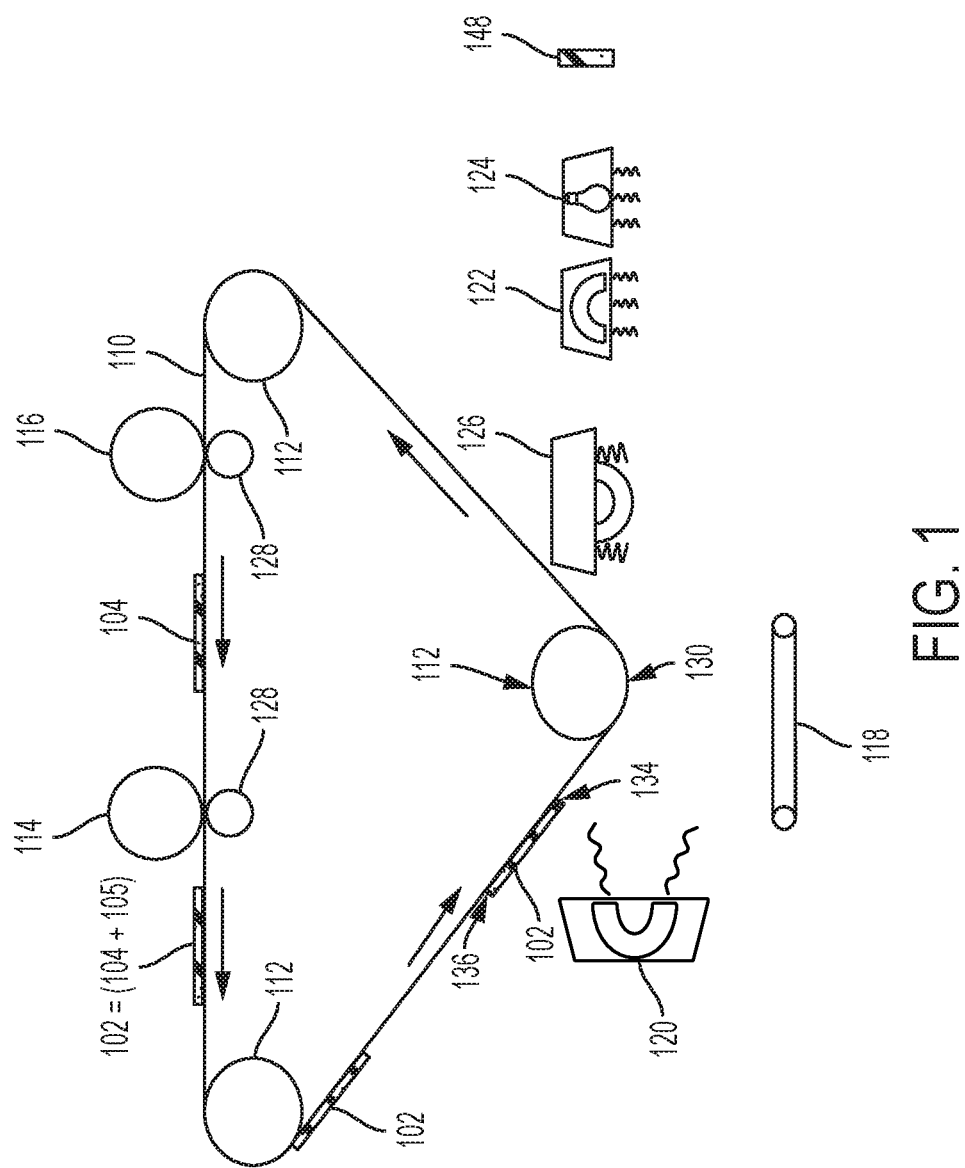
FIG. 1 is a schematic cross-section diagram partially illustrating devices herein.

As shown, for example, in FIG. 1, 3-D printers herein include, among other components, an intermediate transfer surface 110 (which can be a photoreceptor drum or belt, and is sometimes referred to herein as an intermediate transfer belt (ITB)) supported on rollers 112, a first printing component (e.g., development device 116), a second printing component (e.g., development device 114), and a platen 118 (which can be a platform surface or belt) adjacent the ITB 110. In this example, the platen 118 is shown as a vacuum belt. A pattern of build and support material is transferred from the development devices 114, 116 to the intermediate transfer belt 110, and from the intermediate transfer belt to the platen 118. Also, such structures can include a heater 120, 126 and a bonding station that is positioned to apply light (e.g. UV light) using a light source 124 and/or heat using a heater 122. The structure can also include a support material removal station 148.

As shown in FIG. 1, the first printing component 116 is positioned to electrostatically transfer (by way of charge difference between the belt and the material being transferred) a first material 104 (e.g., the build material, such as a (potentially dry) powder polymer-wax material (e.g., charged 3-D toner)) to the ITB 110, and a second printing component 114 (which can also be, for example, a photoreceptor) is positioned to also electrostatically transfer a second material 105 (e.g., the support material, again such as a powder polymer-wax material (e.g., charged 3-D toner)) to a location of the ITB 110 where the first material 104 is located on the ITB 110.

The support material 105 dissolves in solvents that do not affect the build material 104 to allow the printed 3-D structure 104 to be separated from the support material 105 used in the printing process. In the drawings, the combination of the build material 104 and the support material 105 is shown as element 102, and is referred to as a developed layer. The developed layer 102 of the build material 104 and the support material 105 is on a discrete area of the ITB 110 and is in a pattern corresponding to the components of the 3-D structure in that layer (and its associated support elements), where the 3-D structure is being built, developed layer 102 by developed layer 102.

Exemplary individual electrostatic development stations 114, 116 are shown in FIGS. 2 and 4. As shown, such electrostatic development stations 114, 116 are positioned adjacent to (or potentially in contact with) the ITB 110. Each of the individual electrostatic development stations shown in FIGS. 2 and 4 (114, 116) include a cleaning station 160 (that removes charge and debris from a photoreceptor 166), a charging station 162 (e.g., corotron) that creates a uniform charge on the photoreceptor 166, an exposure device 164 that patterns the uniform charge into a patterned charge on the photoreceptor 166, and augers 176 that transfer build or support material to a transport roll 174. Build or support material and permanently magnetized carrier particles, a two-component development material, is maintained within a supply container 170 and is fed to the transport roll 174 by augers 176. Item 128 is a charge generator that creates a charge on the opposite side of the ITB 110 in order to draw the build and support material from the development devices 116, 114 to the ITB 110.

The different development stations 114, 116 can include different developer rolls 172, 178 (or all development stations may be the same); however, both developer rolls 172, 178 provide a constant supply of the two-component development material to the photoreceptor 166, the charge on which attracts the build and support materials, but leaves the permanently magnetized carrier particles, which fall back into in the supply container 170, and are reused (as shown by dark circles in FIGS. 2 and 4).

FIG. 3 illustrates a boosted developer roll 172 (also shown in FIG. 2) in greater detail. As shown in FIG. 3, the boosted developer roll 172 comprises an outer roll 182 rotating in a first rotational direction (shown by a counter-clockwise arrow in FIG. 3) to move with movement of the photoreceptor (also shown by a different counter-clockwise arrow in FIG. 3). The outer roll 182 can be a non-magnetic tubular member made from aluminum, for example, and can have the exterior circumferential surface thereof roughened. A magnetic roll 180 is positioned within the outer roll 182. The magnetic roll 180 rotates in a second rotational direction, opposite the first rotational direction (clockwise arrow in FIG. 3). The magnetic roll 180 comprises alternating permanent magnets 184, 186. The magnetic roll 180 is coaxial with the outer roll 182 and the magnetic roll 180 has a smaller diameter than the outer roll 182; and therefore, the outer roll 182 is between the magnetic roll 180 and the photoreceptor 166. Each of the alternating permanent magnets 184, 186 is an elongated magnet that is parallel to the axis of the outer roll 182, and can be as long as the axis of the outer roll 182. Therefore, the alternating permanent magnets 184, 186 extend along the interior surface of the outer roll 182 from inboard edge to outboard edge, and are spaced slightly from the interior surface of the outer roll 182.

FIG. 5 illustrates fixed-magnet developer roll 178 (also shown in FIG. 4) in greater detail. The fixed-magnet developer roll 178 in FIGS. 4 and 5 may optionally be used in some development devices, and is arbitrarily shown in this example as being used in the build material development device 116. The fixed-magnet developer roll 178 includes one or more fixed permanent magnets 188 located where the material attaches to the outer roll 182, and the outer roll 182 rotates around such fixed permanent magnet(s) 188. Such a fixed permanent magnet 188 is an elongated magnet that is parallel to the axis of the outer roll 182, and can be as long as the axis of the outer roll 182. Therefore, the fixed permanent magnet 188 extends along the interior surface of the outer roll 182, and it is spaced slightly from the interior surface of the outer roll 182. The fixed permanent magnet 188 is stationary and does not rotate with, or against, the outer roll 182. The outer roll 182 thus includes magnetized regions adjacent the permanent magnet 188 where developer material is attached to the outer roll 182, and non-magnetized regions away from the permanent magnet 188 that allow the developer material to release from the outer roll 182 and transfer to the photoreceptor 166.

In these systems, the boosted developer roll 172 uses a different type of carrier particles from the fixed-magnet developer roll 178. More specifically, the boosted developer roll 172 uses permanently magnetized carrier particles; while, to the contrary, the fixed-magnet developer roll 178 uses soft magnetic carrier particles. The "soft" magnetic carrier particles are referred to as such because the soft magnetic carrier particles can have their magnetism changed.

As noted above, the combination of the rotating magnets 184, 186 with alternating magnetic fields acting upon the permanently magnetized carrier beads in the boosted developer roll 172 generates an intense amount of agitation of the two-component development material, and this dramatically increases the thickness of the build or support material (black dots in FIGS. 2 and 4) on the photoreceptor 166 and intermediate transfer surface 110, which reduces the number of fabrication passes and increases production capacity. Therefore, rotation of the magnetic roll 180 within the outer roll 182 increases the amount of material 102 that the boosted developer roll 172 is able to supply to the photoreceptor 166, relative to the fixed-magnet developer roll 178 (and this is shown graphically as more build and support material is transferred to the photoreceptor 166 in FIG. 2, relative to FIG. 4, as shown by the black dots); and this eventually results in thicker layers 102 being transferred to the platen 118, which reduces the numbers of layers 102 that need to be transferred for the same sized part being 3-D printed and makes the 3-D printing faster.

More specifically, without a counter-rotating magnetic roll, the carrier beads tend to align themselves into chains that extend normal to the developer roll surface over pole faces, and lay down parallel to the developer roll surface between pole faces (where the magnetic field direction is tangent to the roll surface). The net result is that an effective developer bed height varies from a maximum over the pole face areas to a minimum over pole transition areas in a fixed-magnet developer roll 178. Counter-rotation of the magnetic roll 180 within the outer roll 182 causes the developer material to collectively tumble and flow due to the response of permanent magnetic carrier particles to the changes in magnetic field direction and magnitude caused by an internal rotating magnetic roll 180. Magnetic agitation of the carrier also serves to reduce adhesion of the toner particles to the carrier beads on the outer roll 182.

Therefore, if the desired operation is to increase the amount of build and support materials transferred to the intermediate transfers surface 110, all development devices can utilize the boosted developer roll 172 that includes the counter-rotating magnetic roll 180. However, in other situations, it can be advantageous if only one of the development stations includes the boosted developer roll 172 that has the counter-rotating magnetic roll 180, while other development station(s) can include developer rolls 178 that use the fixed-magnets 188, and do not have a counter-rotating magnetic roll.

Utilizing the counter-rotating magnet roll 180 in some of the development stations and using fixed-magnets 188 in other development stations can be useful for accommodating build and support materials that have very different physical characteristics (different sizes, different charge holding capabilities, different post-fuse size reductions, etc.). For example, the increased material production capability of the boosted developer roll 172 can help to accommodate such different characteristics of the different build and support materials by balancing the amounts of the build and support materials transferred to the ITB 110 different.

For example, many support materials are recyclable and are not consumed in the 3-D printing process, while some build and support materials suffer large thickness reductions during fusing. For example, recyclable support materials can be glass beads, durable powders, etc., which may not be the same particle size as (or have the same charge holding capability) as the particles of the build material. Utilizing the counter-rotating magnetic roll 180 to increase the amount of one material (e.g., support material) supplied (relative to the other material (e.g., build material)) to the intermediate transfer surface 110 can help compensate for such material differences between the build and support materials. Alternatively, other operations may desire to provide a greater amount of build material relative to the amount of support material supplied, so as to reduce the amount of support material used, or for other reasons. Therefore, the counter-rotation of the magnetic roll 182 can allow one of the development devices to supply more material to the photoreceptor relative to the amount of the material the other developer roll supplies to the other photoreceptor, to accommodate different characteristics of the build and support materials.

Figure 6:
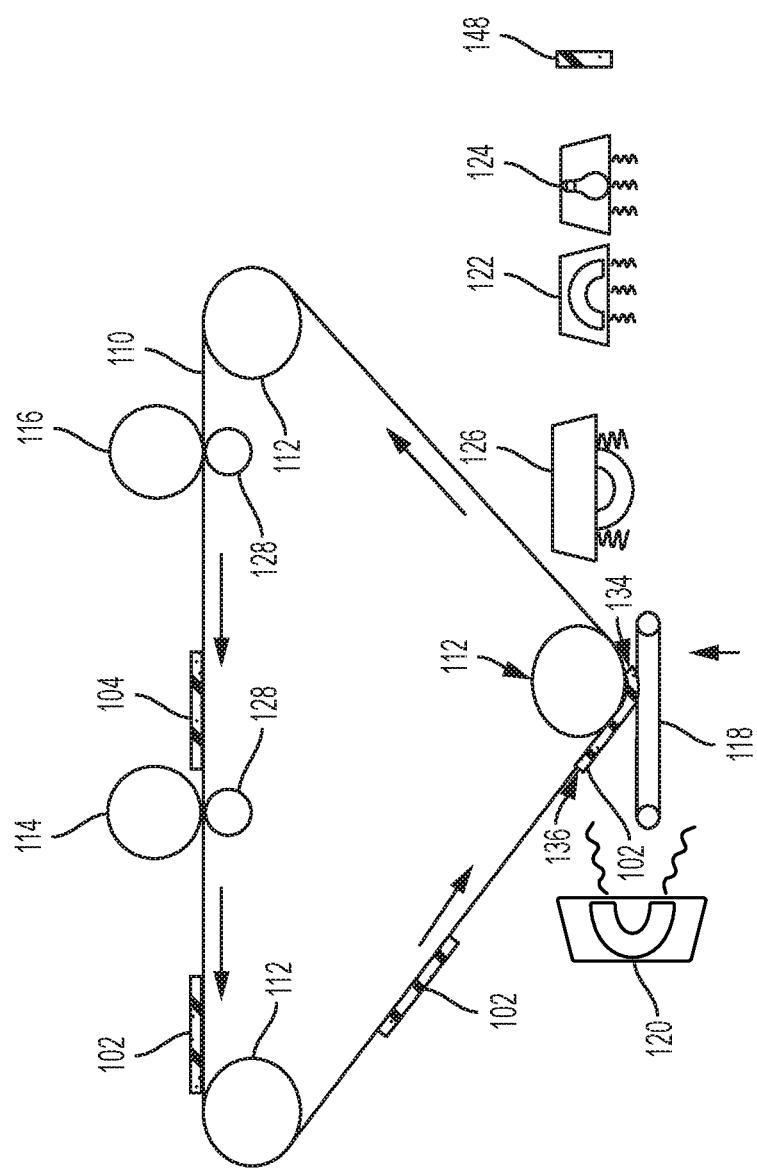
FIGS. 6-18 are schematic cross-section diagrams partially illustrating devices herein.

As shown by the vertical arrow in FIG. 6, the platen 118 moves (using motors, gears, pulleys, cables, guides, etc. (all generally illustrated by item 118)) toward the ITB 110 to have the platen 118 make contact with the ITB 110. The developed layer 102 and ITB 110 are locally heated by heater 120 to bring the developed layer 102 to a "tacky" state prior to transfuse (i.e., to a temperature higher than the glass transition temperature (Tg) but short of the melt or fuse temperature Tm of the toner resin). The platen 118 is also heated by heater 120 to approximately the same temperature, and is then contacted synchronously with the tacky layer 102 as it translates through the ITB-platen nip (the transfuse nip 130). Thereby, the ITB 110 transfers one of the developed layer 102 of the build material 104 and the support material 105 to the platen 118 each time the platen 118 contacts the ITB 110, to successively form developed layers 102 of the build material 104 and the support material 105 on the platen 118.

Such build and support material are printed in a pattern on the ITB by each separate development device 114, 116, and combine together in the developed layers 102 to represent a specific pattern having a predetermined length. Thus, each of the developed layers 102 has a leading edge 134 oriented toward the processing direction in which the ITB 110 is moving (represented by arrows next to the ITB 110) and a trailing edge 136 opposite the leading edge 134.

Figure 7:
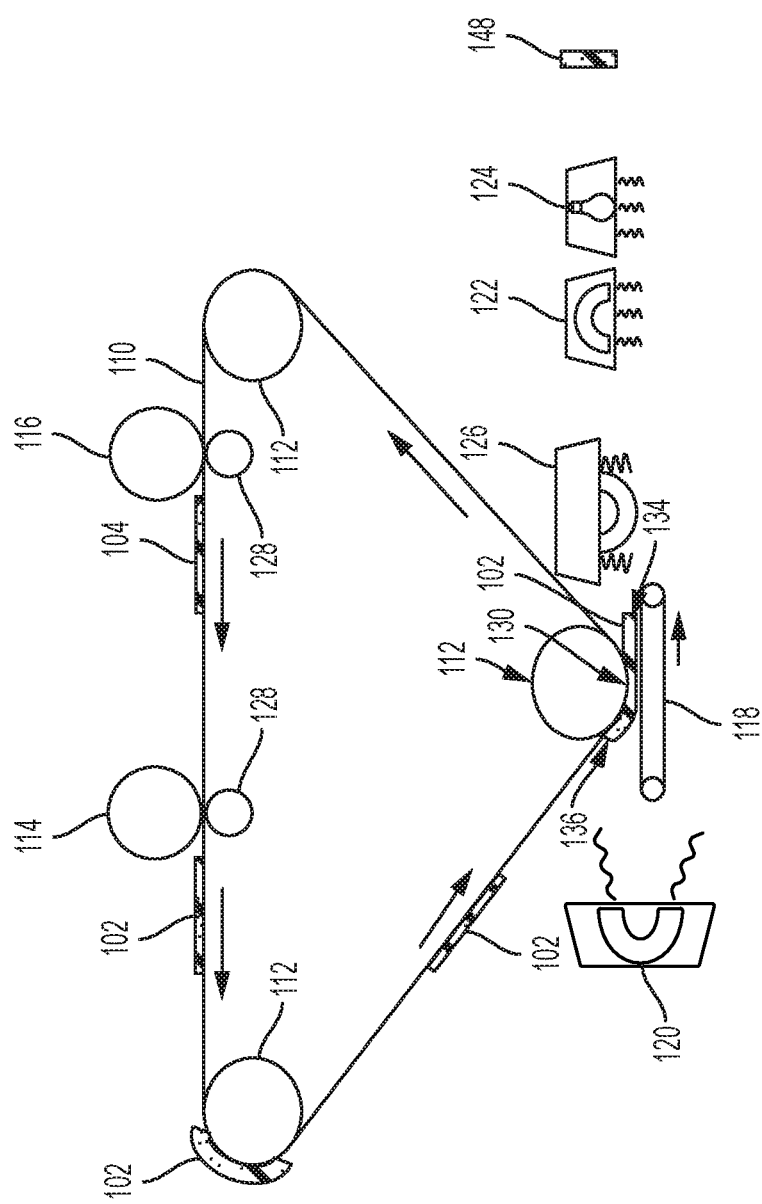

More specifically, as shown in FIG. 7, at the transfuse nip 130, the leading edge 134 of the developed layer 102 within the transfuse nip 130 begins to be transferred to a corresponding location of the platen 118. Thus, in FIG. 7, the platen 118 moves to contact the developed layer 102 on the ITB 110 at a location where the leading edge 134 of the developed layer 102 is at the lowest location of the roller of the transfuse nip 130. Thus, in this example, the trailing edge 136 of the developed layer 102 has not yet reached the transfuse nip 130 and has not, therefore, yet been transferred to the platen 118.

As shown in FIG. 7, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 7, the trailing edge 136 of the developed layer 102 is the only portion that has not yet reached the transfuse nip 130 and has not, therefore, been transferred to the platen 118 or a freestanding stack of developed layers 106. Then, as the ITB 110 moves in the processing direction, the platen 118 moves at the same speed and in the same direction as the ITB 110, until the trailing edge 136 of the developed layer 102 reaches the bottom of the roller of the transfuse nip 130, at which point the platen 118 moves away from the ITB 110 and over to the heater 126, as shown in FIG. 8 (the heater 126 can be a non-contact (e.g., infrared (IR) heater, or a pressure heater, such as a fuser roller).

Figure 8:
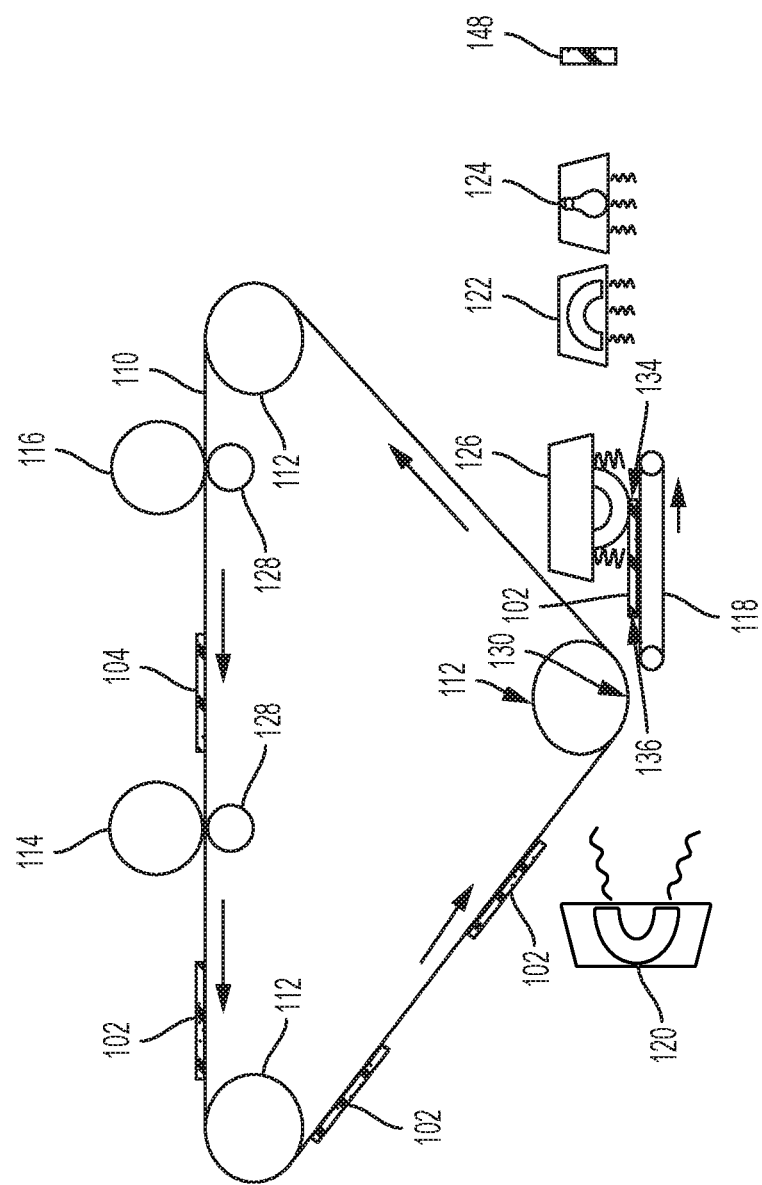
Figure 9:
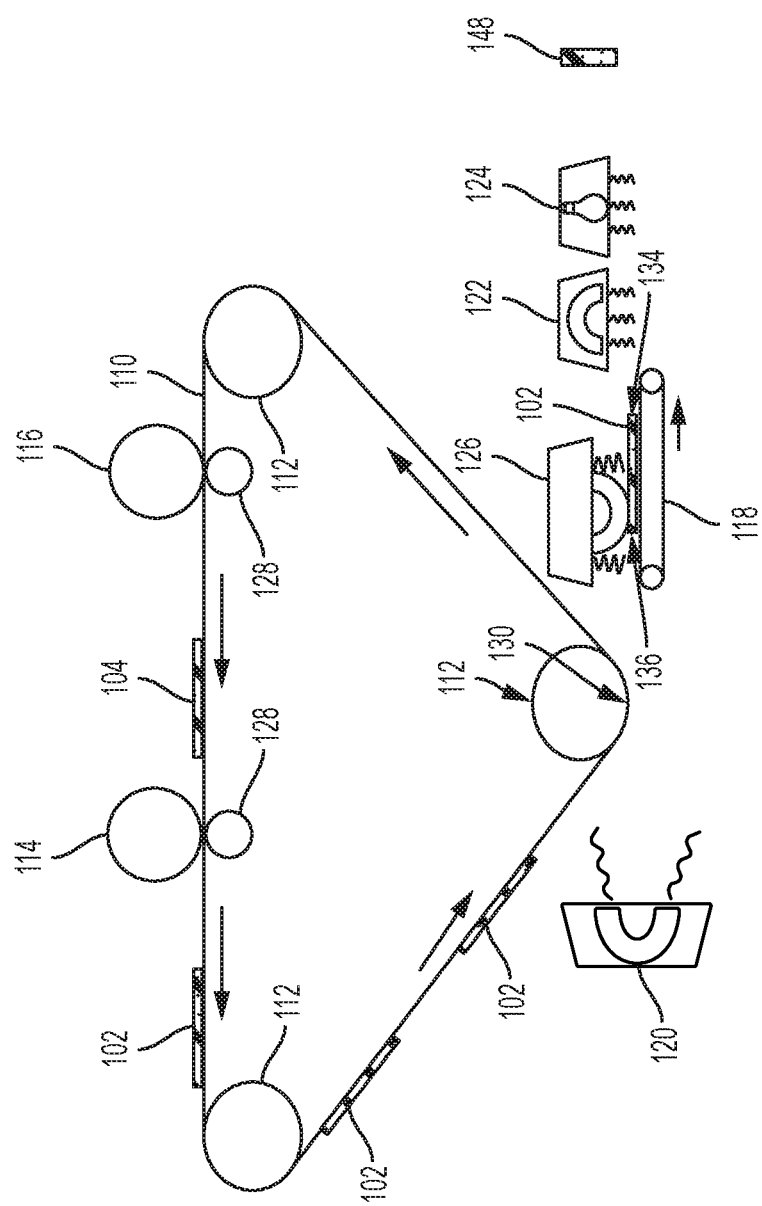

As shown in FIGS. 8 and 9, if the heater 126 is a pressure roller, the platen 118 moves synchronously as the roller rotates, heating and pressing to fuse the developed layer 102 to the platen 118. This synchronous movement between the platen 118 and the ITB 110 (and heater roller 126) causes the pattern of support and build materials (102) that is printed by the development devices 116, 114 to be transferred precisely from the ITB 110 to the platen 118, without distortion or smearing.

Figure 10:
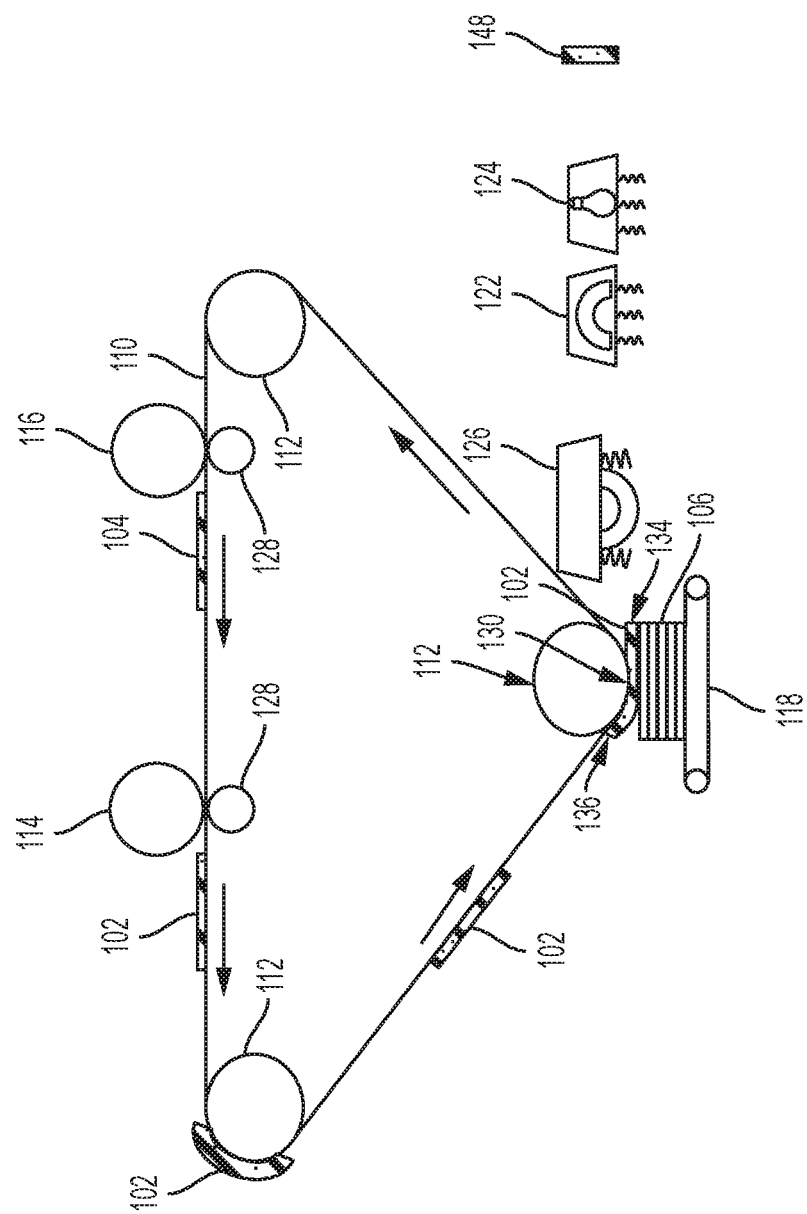
Figure 11:
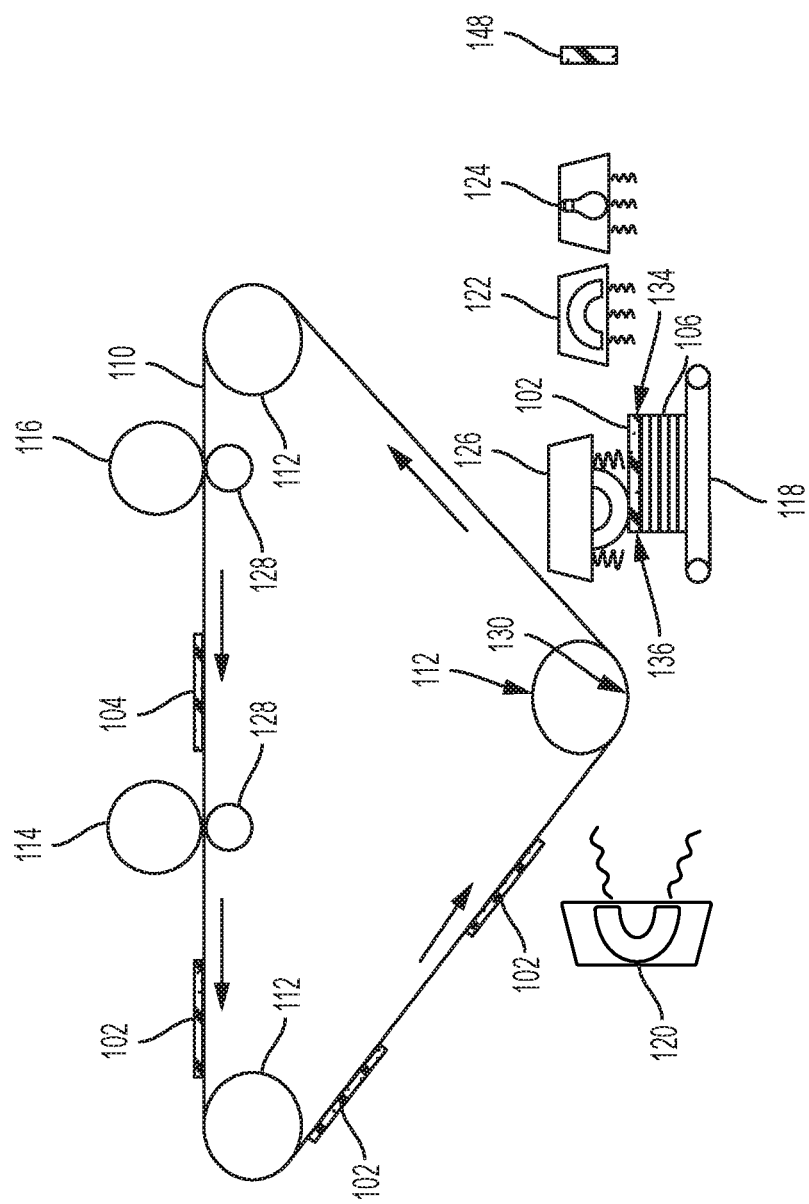

Thus, the processing in FIGS. 6-9 is repeated to fuse multiple developed layers 102 to the platen 118 (and to one another). The platen 118 can move to the heater 126 and bonding station 122/124 after each time the ITB 110 transfers each of the developed layers 102 to the platen 118 to independently heat each of the developed layers 102 and successively join each the developed layer 102 to the platen 118 and to any previously transferred developed layers 102 on the platen 118. In other alternatives, the platen 118 may only move to the heater 126 after a specific number (e.g., 2, 3, 4, etc.) of the developed layers 102 have been placed on the platen 118 to allow multiple developed layers 102 to be simultaneously fused to the platen 118 and to each other. As the stack 106 of the developed layers 102 grows, additional developed layers 102 are formed on top of the stack 106, as shown in FIG. 10, and such additional developed layers 102 are heated by the heater 126, as shown in FIG. 11, to fuse all the develop layers 102 within the stack 106 together.

Figure 12:
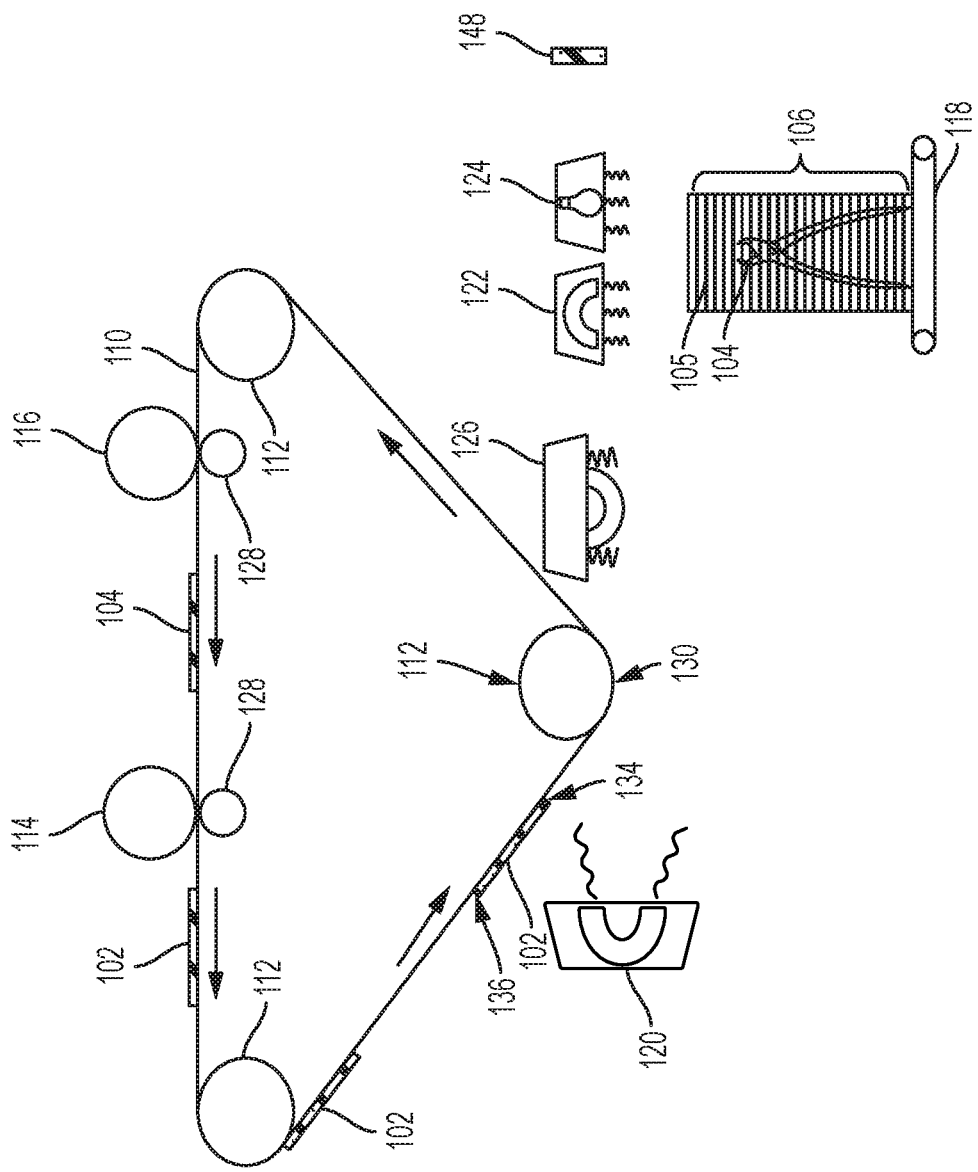

As shown in FIG. 12, the bonding station 122, 124 is configured to apply light and/or heat to the 3-D structure to bond the developed layers 102 in the freestanding stack 106 to one another on the platen 118. The selective use of heaters, lights, and other components 122, 124 of the bonding station will vary depending upon the chemical makeup of the developed layers 102.

In one example, the build material 104 can include UV curable toners. Bonding station 122, 124 bonds such materials by heating the materials to a temperature between their glass transition temperature and their melting temperature, and then applies UV light to cross-link the polymers within the materials, thereby creating a rigid structure. Those ordinarily skilled in the art would understand that other build and support materials would utilize other bonding processing and bonding components, and that the foregoing is presented only as one limited example; and the devices and methods herein are applicable to all such bonding methods and components, whether currently known or developed in the future.

In one example, the bonding station 122, 124 can apply light and/or heat (potentially after each time the ITB 110 transfers each of the developed layers 102 to the platen 118, or less frequently) to bond the developed layers 102 in each of the freestanding stacks 106 to each other, and to any previously transferred developed layers 102 of the 3-D structure on the platen 118, as shown in FIG. 12, to successively form a 3-D structure of freestanding stacks 106. In addition, FIG. 12 illustrates an overlay showing portions of support material 105 and build material 104 within the accumulation of freestanding stacks 106. Such may or may not be visible, and is only illustrated to show one exemplary way in which such build and support materials may be arranged.

Figure 13:
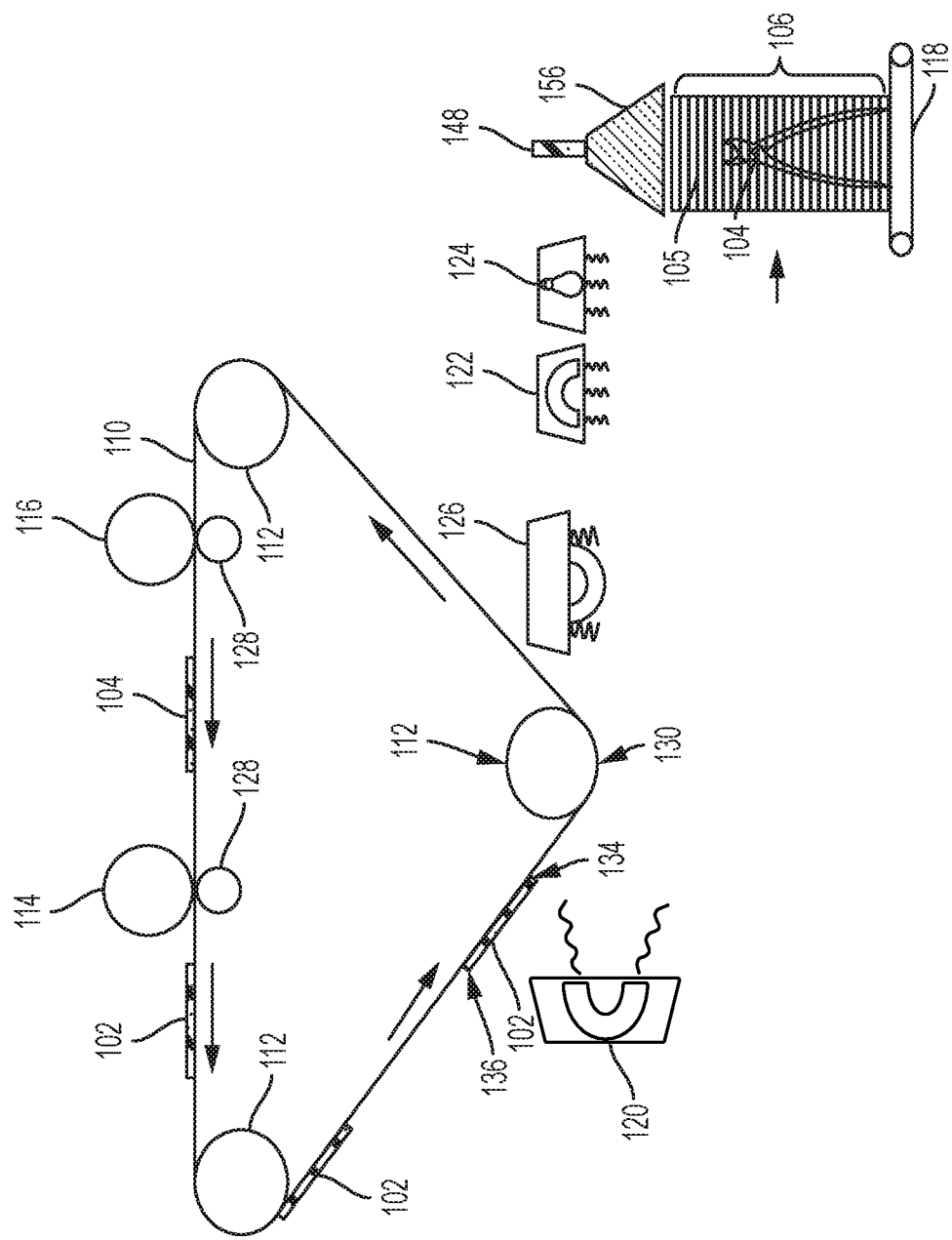
Figure 14:
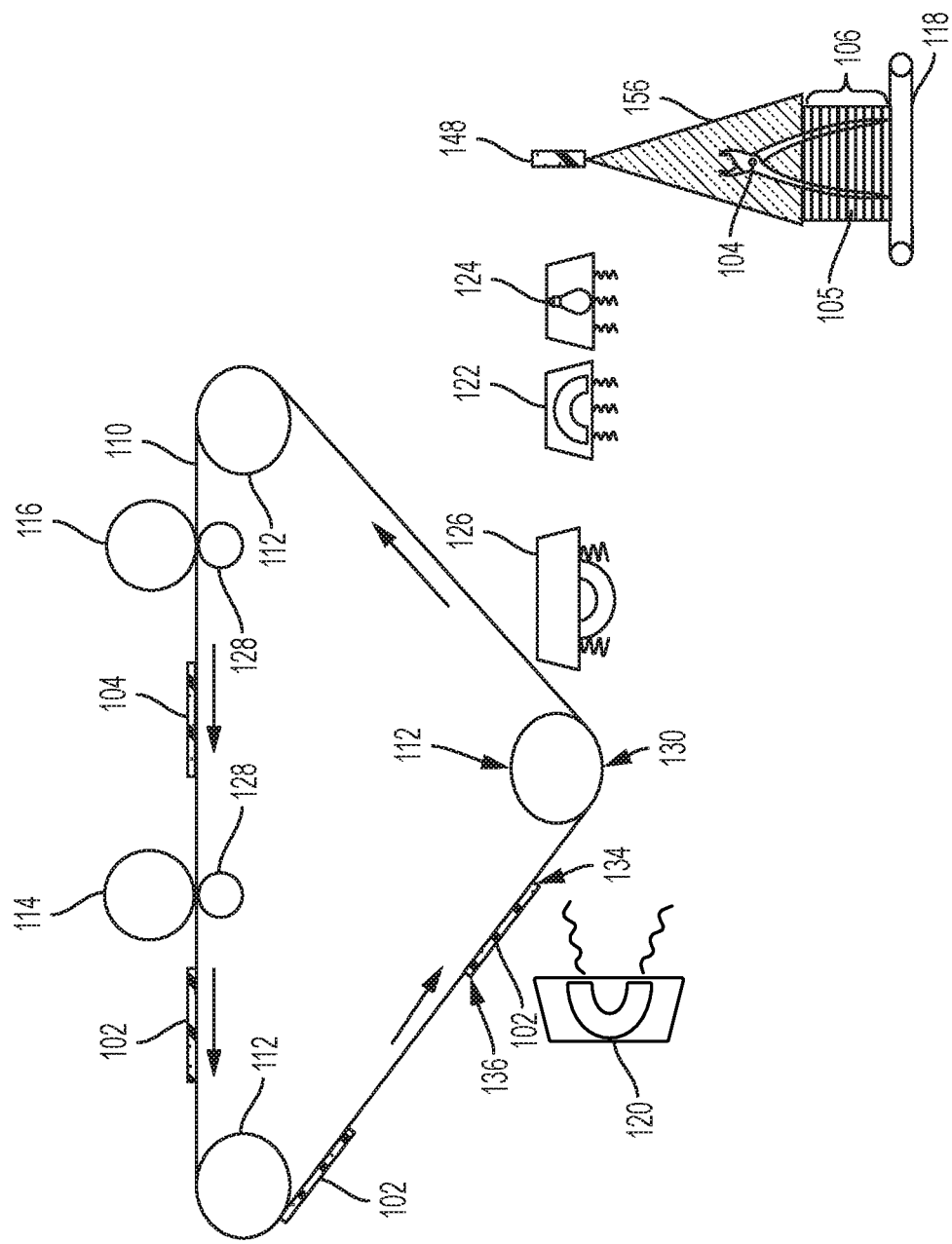
Figure 15:
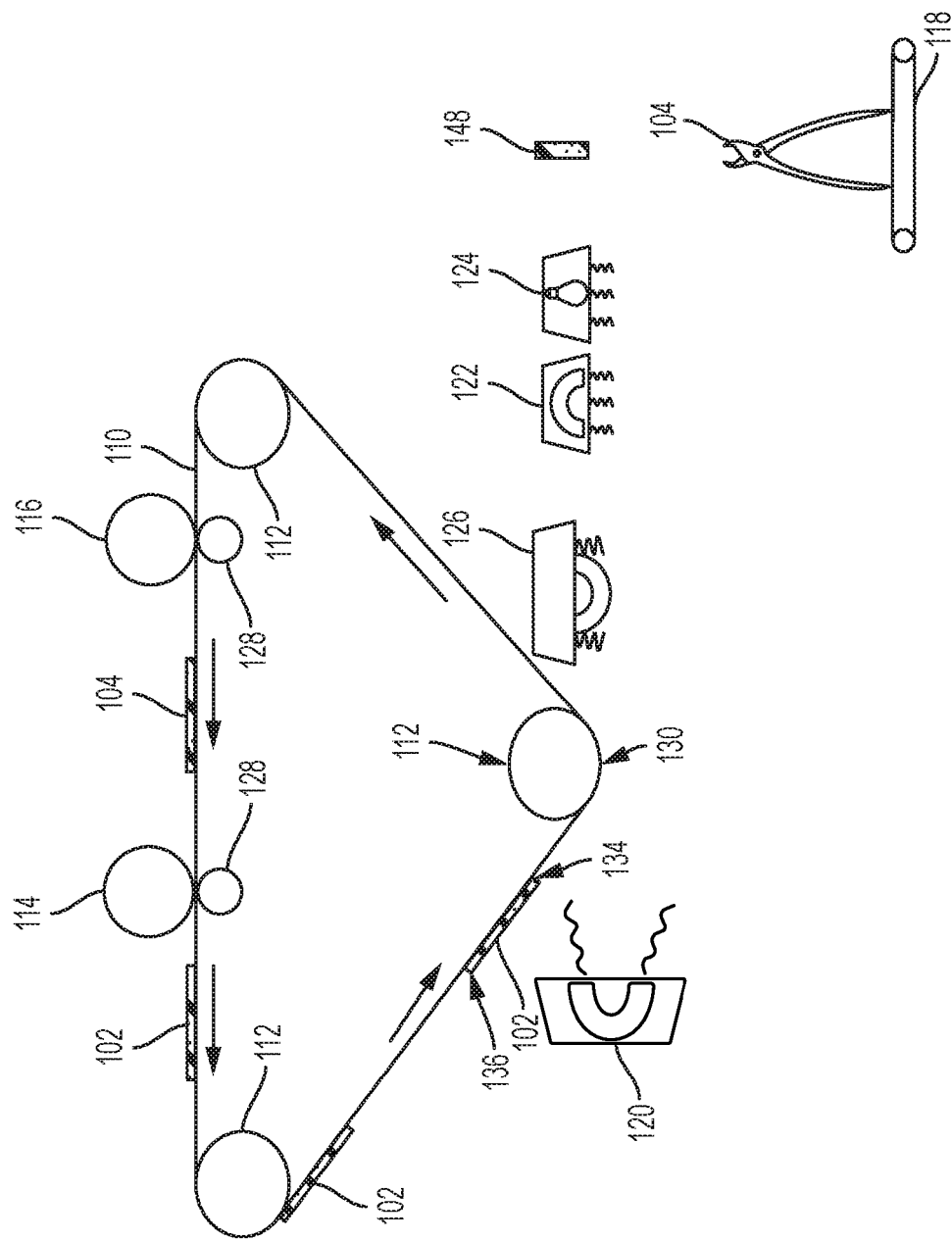

The 3-D structure of the freestanding stack 106 can be output to allow manual removal of the support material 105 using an external solvent bath; or processing can proceed as shown in FIG. 13-15. More specifically, in FIG. 13, the support material removal station 148 is positioned to receive the now bonded 3-D structure of freestanding stack 106 on the platen 118. The support material removal station 148 applies a solvent 156 that dissolves the support material 105 without affecting the build material 104. Again, as noted above, the solvent utilized will depend upon the chemical makeup of the build material 104 and the support material 105. FIG. 14 illustrates the processing where about half of the support material 105 remains, and a portion of the build material 104 protrudes from the remaining stack of support material 105. FIG. 15 illustrates processing after the support material removal station 148 has applied sufficient solvent 156 to dissolve all the support material 105, leaving only the build material 104 remaining, which leave a completed 3-D structure made of only the build material 104.

Figure 16:
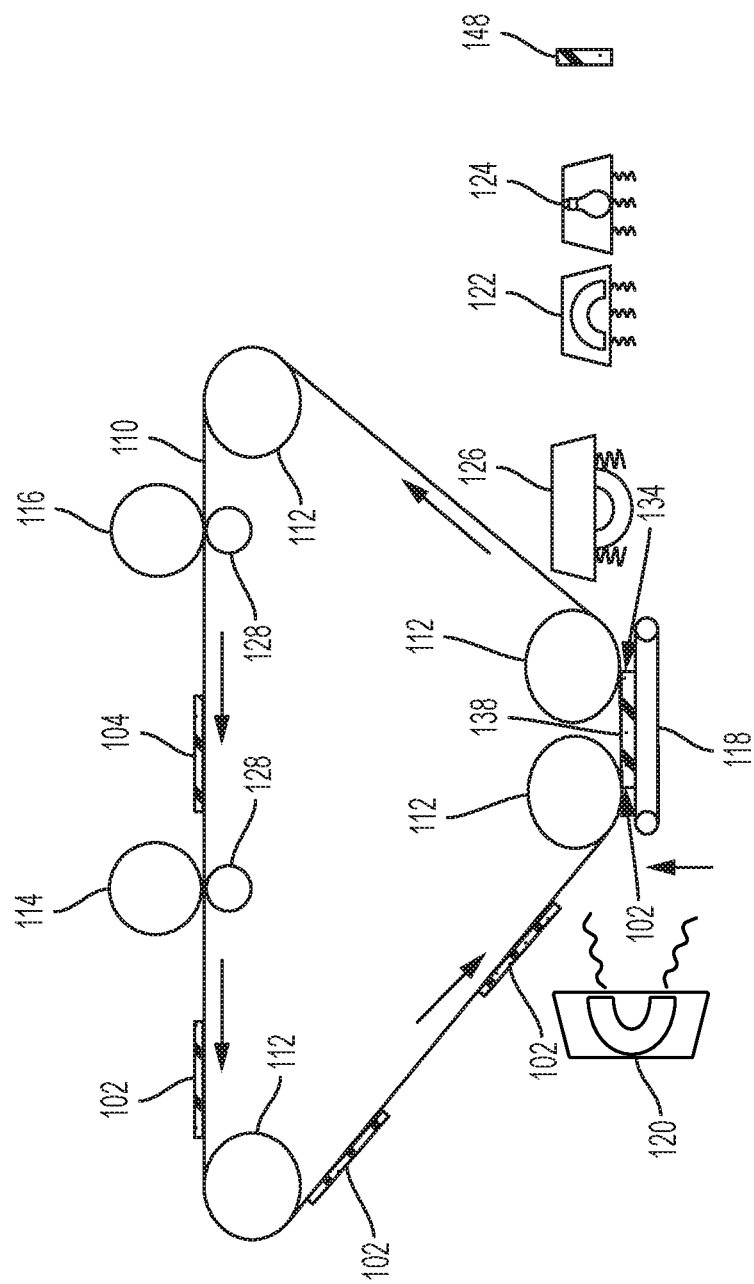
Figure 17:
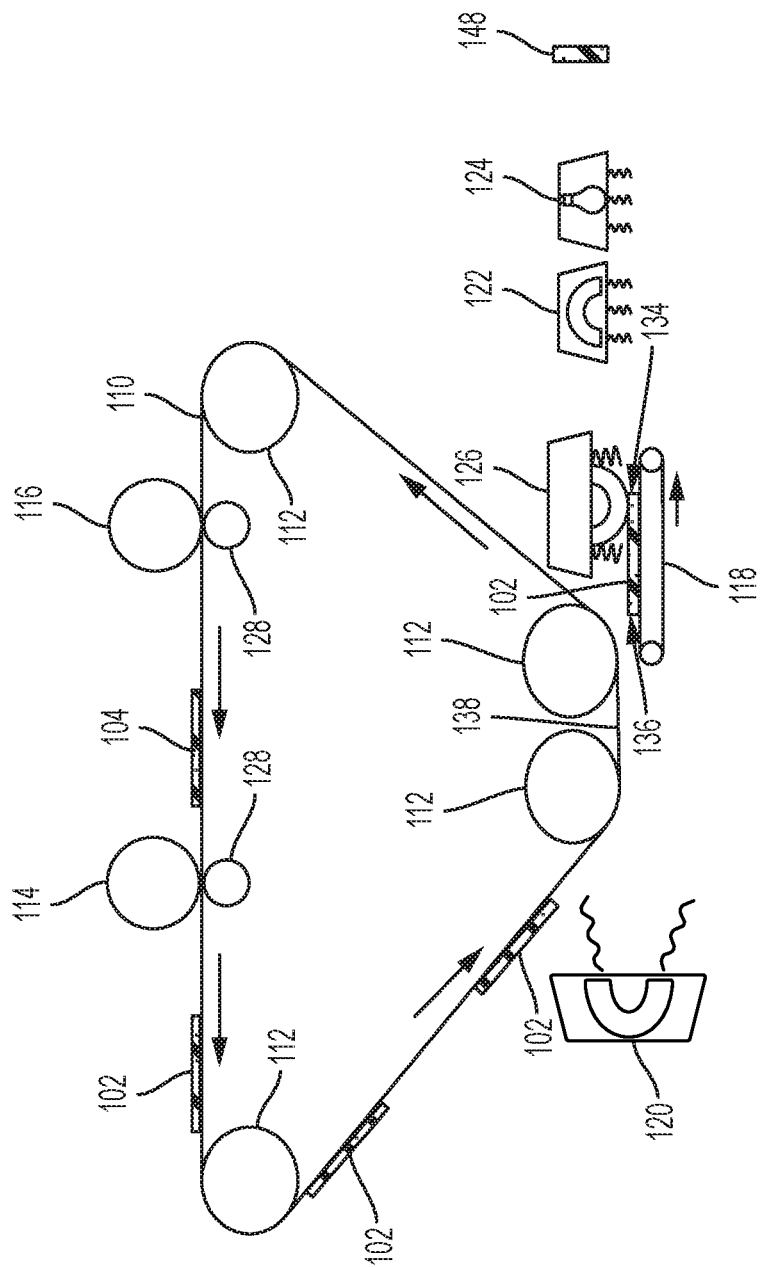

FIGS. 16 and 17 illustrate an alternative 3-D electrostatic printing structure herein which includes a planar transfuse station 138 in place of the transfuse nip 130 shown in FIG. 1. As shown in FIG. 16, the planar transfuse station 138 is a planar portion of the ITB 110 that is between rollers 112 and is parallel to the platen 118. As shown in FIG. 17, with this structure, when the platen 118 moves to contact the planar transfuse station 138, all of the developed layer 102 is transferred simultaneously to the platen 118 or partially formed stack 106, avoiding the rolling transfuses process shown in FIGS. 6 and 7.

Figure 18:
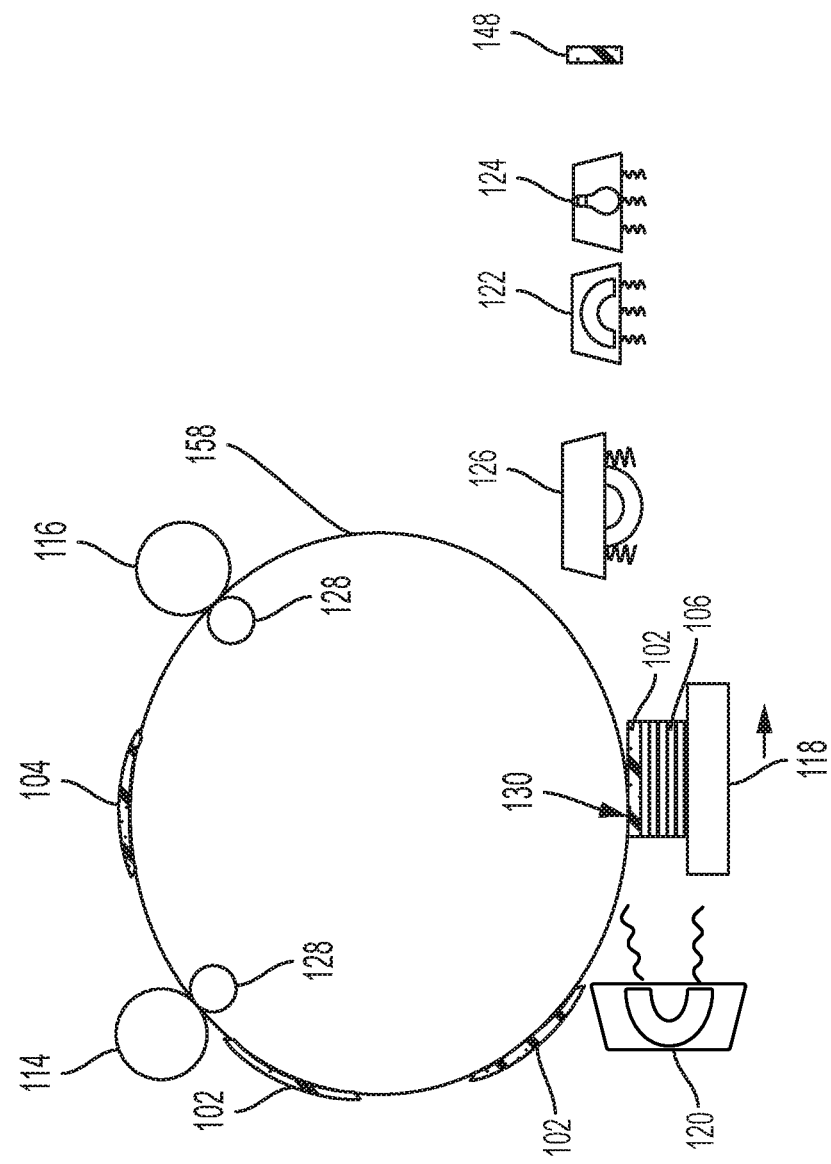

Similarly, as shown in FIG. 18, a drum 158 could be used in place of the ITB 110, with all other components operating as described herein. Thus, the drum 158 could be an intermediate transfer surface receiving material from development stations 114, 116, as described above, or could be a photoreceptor and operate as the photoreceptor 256 described below operates, by maintaining a latent image of charge and receiving materials from development devices 254.

Figure 19:
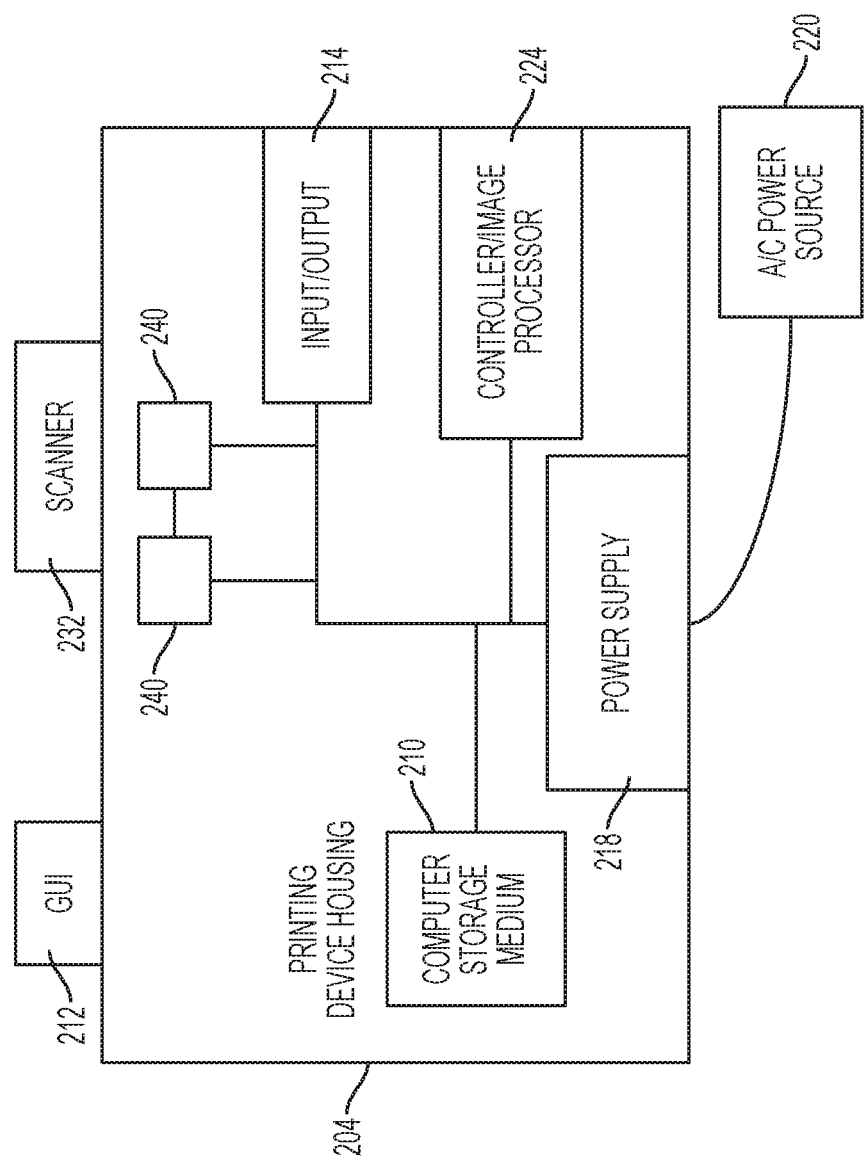
FIG. 19 is a schematic diagram illustrating printing devices herein.

FIG. 19 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 19, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 20:
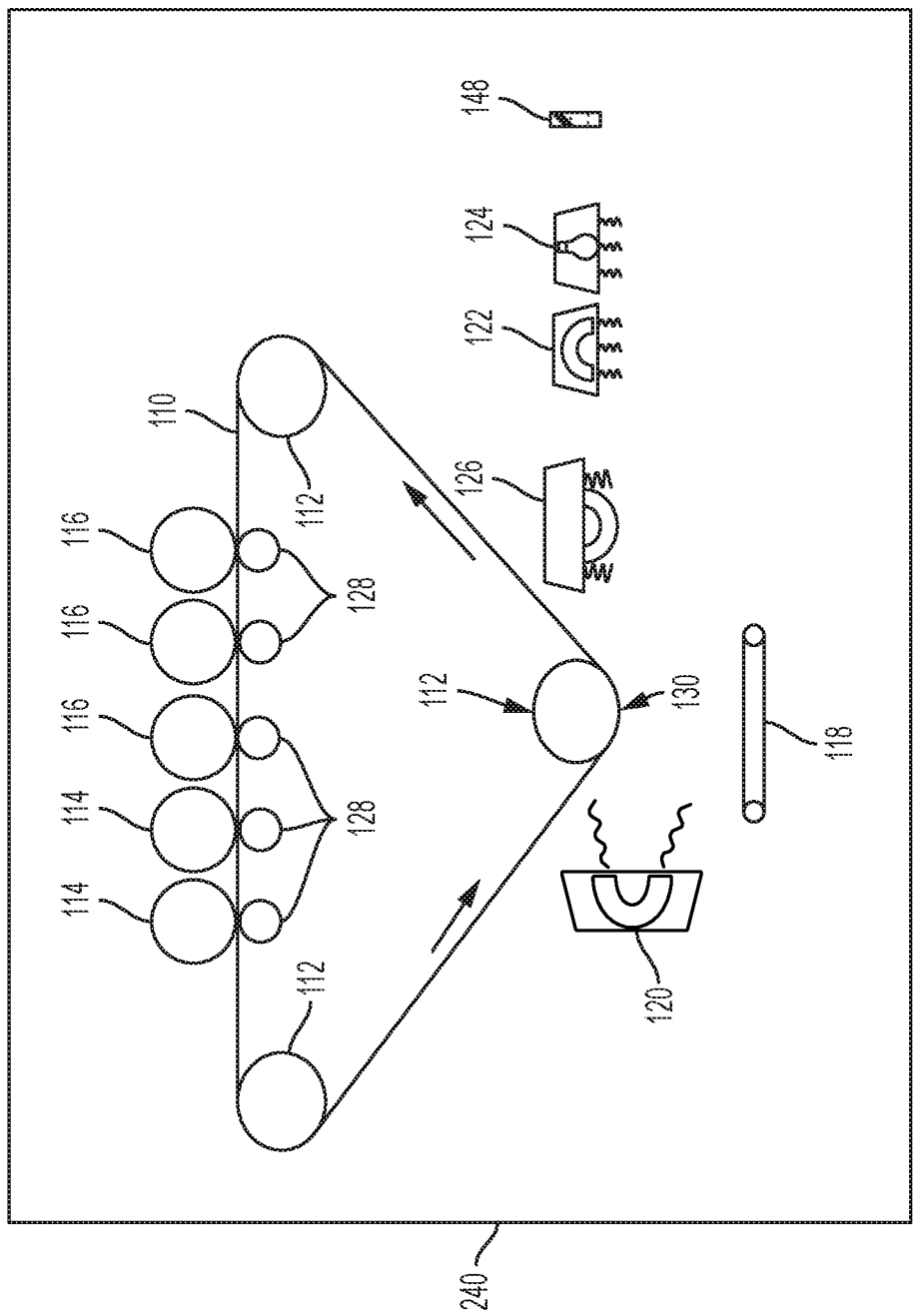
FIG. 20 is a schematic cross-section diagram partially illustrating devices herein.

The one or more printing engines 240 are intended to illustrate any marking device that applies build and support materials (toner, etc.) whether currently known or developed in the future and can include, for example, devices that use an intermediate transfer belt 110 (as shown in FIG. 20).

Thus, as shown in FIG. 20, each of the printing engine(s) 240 shown in FIG. 16 can utilize one or more potentially different (e.g., different color, different material, etc.) build material development stations 116, one or more potentially different (e.g., different color, different material, etc.) support material development stations 114, etc. The development stations 114, 116 can be any form of development station, whether currently known or developed in the future, such as individual electrostatic marking stations, individual inkjet stations, individual dry ink stations, etc. Each of the development stations 114, 116 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 20 illustrates five development stations adjacent or in contact with a rotating belt (110), as would be understood by those ordinarily skilled in the art, such devices could use any number of marking stations (e.g., 2, 3, 5, 8, 11, etc.).

FIG. 21 is an expanded diagram showing how the developed layers 102 may contain some of the build material 104 and some of the support material 105, and how the lowest developed layer 102 is joined to the platen 118, and how each successive developed layer 102 contacts and is joined to the immediately preceding adjacent developed layer 102 that is below to form a stack 106 of developed layers 102 on the platen 118. As noted above, the particles of build materials 104 and support material 105 within the developed layer 102 (shown as particles (not drawn to scale) in FIG. 21, using identification number 102) are tacky particles of powder joining a tacky top developed layer 102.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
    an intermediate transfer surface;
    a first development station positioned to electrostatically transfer a first material to said intermediate transfer surface;
    a second development station positioned to electrostatically transfer a second material to a location of said intermediate transfer surface where said first material is located on said intermediate transfer surface, said second material is different from said first material;
    a platen moving relative to said intermediate transfer surface, said intermediate transfer surface transfers a layer of said first material and said second material to said platen each time said platen contacts said intermediate transfer surface to successively form a freestanding stack of layers of said first material and said second material on said platen; and
    a bonding station positioned to bond said layers within said freestanding stack to one another on said platen,
    said first development station and said second development station each comprises a photoreceptor supplying said first material or said second material to said intermediate transfer surface, and a developer roll supplying said first material or said second material to said photoreceptor,
    said first development station further comprises a first supply container maintaining said first material and first carrier particles,
    said second development station further comprises a second supply container maintaining said second material and second carrier particles,
    said first carrier particles have different magnetic characteristics from said second carrier particles,
    said developer roll of said first development station comprises a fixed-magnet developer roll that uses said first carrier particles to supply said first material to said photoreceptor,
    said developer roll of said second development station comprises an outer roll rotating in a first rotational direction to move with movement of said photoreceptor, and a magnetic roll within said outer roll rotating in a second rotational direction opposite said first rotational direction that uses said second carrier particles to supply said second material to said photoreceptor, and
    said magnetic roll comprises alternating permanent magnets.

2. The 3-D printer according to claim 1, rotation of said magnetic roll within said outer roll increases amounts of said second material on said outer roll.

3. The 3-D printer according to claim 1, said magnetic roll is coaxial with said outer roll, and said outer roll is between said magnetic roll and said photoreceptor.

4. The 3-D printer according to claim 1, said first development station and said second development station each further comprises a transport roll supplying said first material or said second material to said developer roll.

5. The 3-D printer according to claim 1, said layer of said first material and said second material is on a discrete area of said intermediate transfer surface and is in a pattern before being transferred to said intermediate transfer surface.

6. The 3-D printer according to claim 1, said bonding station applies light and/or heat after each time said intermediate transfer surface transfers each of said layers of said first material and said second material to said platen.

7. The 3-D printer according to claim 1, further comprising a support material removal station positioned to receive said freestanding stack from said platen, said support material removal station removes said second material without affecting said first material to leave a 3-D structure made of only said first material.

8. A three-dimensional (3-D) printer comprising:
    an intermediate transfer surface;
    a first development station positioned to electrostatically transfer a first material to said intermediate transfer surface;
    a second development station positioned to electrostatically transfer a second material to a location of said intermediate transfer surface where said first material is located on said intermediate transfer surface, said second material is different from said first material;
    a platen moving relative to said intermediate transfer surface, said intermediate transfer surface transfers a layer of said first material and said second material to said platen each time said platen contacts said intermediate transfer surface to successively form a freestanding stack of layers of said first material and said second material on said platen; and
    a bonding station positioned to bond said layers within said freestanding stack to one another on said platen,
    said first development station comprises a first photoreceptor supplying said first material to said intermediate transfer surface, a first supply container maintaining said first material, and first carrier particles, and a fixed-magnet developer roll supplying said first material to said first photoreceptor, said second development station comprises a second photoreceptor supplying said second material to said intermediate transfer surface, a second supply container maintaining said second material and permanently magnetized carrier particles, and a boosted developer roll using said permanently magnetized carrier particles to supply said second material to said second photoreceptor, said first carrier particles have different magnetic characteristics from said permanently magnetized carrier particles, said boosted developer roll comprises an outer roll rotating in a first rotational direction to move with movement of said second photoreceptor, and a magnetic roll within said outer roll rotating in a second rotational direction opposite said first rotational direction, and said magnetic roll comprises alternating permanent magnets.

9. The 3-D printer according to claim 8, rotation of said magnetic roll within said outer roll increases amounts of said second material on said outer roll.

10. The 3-D printer according to claim 8, said magnetic roll is coaxial with said outer roll, and said outer roll is between said magnetic roll and said second photoreceptor.

11. The 3-D printer according to claim 8, said second development station further comprises a transport roll supplying said second material to said boosted developer roll.

12. The 3-D printer according to claim 8, said layer of said first material and said second material is on a discrete area of said intermediate transfer surface and is in a pattern before being transferred to said intermediate transfer surface.

13. The 3-D printer according to claim 8, said bonding station applies light and/or heat after each time said intermediate transfer surface transfers each of said layers of said first material and said second material to said platen.

14. The 3-D printer according to claim 8, further comprising a support material removal station positioned to receive said freestanding stack from said platen, said support material removal station removes said second material without affecting said first material to leave a 3-D structure made of only said first material.

15. A three-dimensional (3-D) printer comprising:
an intermediate transfer surface;
a first development station positioned to electrostatically transfer a first material to said intermediate transfer surface;
a second development station positioned to electrostatically transfer a second material to a location of said intermediate transfer surface where said first material is located on said intermediate transfer surface, said second material is different from said first material;

a platen moving relative to said intermediate transfer surface, said intermediate transfer surface transfers a layer of said first material and said second material to said platen each time said platen contacts said intermediate transfer surface to successively form a freestanding stack of layers of said first material and said second material on said platen; and a bonding station positioned to bond said layers within said freestanding stack to one another on said platen, said first development station comprises a first photoreceptor supplying said first material to said intermediate transfer surface, a first supply container maintaining said first material, and non-permanently magnetized carrier particles, and a fixed-magnet developer roll supplying said first material to said first photoreceptor, said second development station comprises a second photoreceptor supplying said second material to said intermediate transfer surface, a second supply container maintaining said second material and permanently magnetized carrier particles, and a boosted developer roll using said permanently magnetized carrier particles to supply more of said second material to said second photoreceptor relative to an amount of said first material said fixed-magnet developer roll using said non-permanently magnetized carrier particles supplies to said first photoreceptor to accommodate different characteristics of said first material and said second material, said boosted developer roll comprises an outer roll rotating in a first rotational direction to move with movement of said second photoreceptor, and a magnetic roll within said outer roll rotating in a second rotational direction opposite said first rotational direction, and said magnetic roll comprises alternating permanent magnets.

16. The 3-D printer according to claim 15, rotation of said magnetic roll within said outer roll increases amounts of said second material on said outer roll.

17. The 3-D printer according to claim 15, said magnetic roll is coaxial with said outer roll, and said outer roll is between said magnetic roll and said second photoreceptor.

18. The 3-D printer according to claim 15, said second development station further comprises a transport roll supplying said second material to said boosted developer roll.

19. The 3-D printer according to claim 15, said layer of said first material and said second material is on a discrete area of said intermediate transfer surface and is in a pattern before being transferred to said intermediate transfer surface.

20. The 3-D printer according to claim 15, said bonding station applies light and/or heat after each time said intermediate transfer surface transfers each of said layers of said first material and said second material to said platen.

* * * * *